Figures 1, 2:
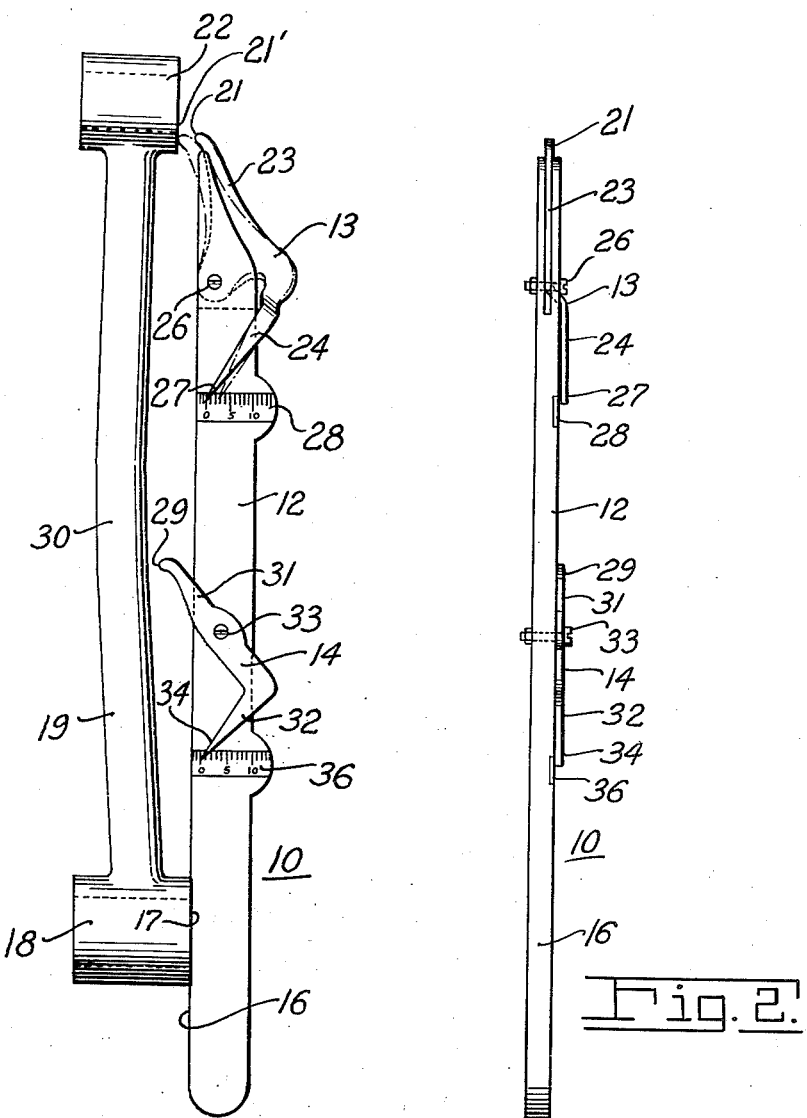

July 20, 1954     A. A. MUELLER     2,683,936
CONNECTING ROD GAUGE

Filed May 27, 1952

INVENTOR.
ALBERT A. MUELLER
BY Zugelter & Zugelter
Attys.

Patented July 20, 1954

2,683,936

UNITED STATES PATENT OFFICE 2,683,936

CONNECTING ROD GAUGE

Albert A. Mueller, South Newport, Ky.

Application May 27, 1952, Serial No. 290,165

3 Claims. (Cl. 33—180)

This invention relates to a gauge for testing alignment of the parts of a connecting rod and more particularly relates to a gauge for determining the relative alignment of the bearing faces and central portion of a connecting rod.

An object of this invention is to provide a gauge for measuring the relative alignment of the plane of the side of the crank shaft bearing of a connecting rod and the plane of the side of the wrist pin bearing thereof.

A further object of this invention is to provide a gauge of this type which also measures the relative alignment between the central portion of a connecting rod and the bearing faces thereof.

A still further object of the invention is to provide a relatively simple device for determining whether or not a connecting rod is bent and how much it is bent.

The above and other objects and features of this invention will in part be apparent and will in part be obvious from the following detailed description, and the drawing, in which:

Figure 1 is a view in front elevation showing a gauge constructed in accordance with an embodiment of this invention, the gauge being shown in operative engagement with a connecting rod; and Fig. 2 is a view in side elevation of the gauge.

In the following detailed description, and the drawing, like reference characters indicate like parts.

As shown in the drawing, a gauge 10 comprises an elongated body 12 to which feelers 13 and 14 are pivotally attached. Feeler 13 is pivotally attached to the body 12 adjacent one end thereof, while feeler 14 is mounted on body 12 substantially centrally thereof.

The body is provided with a flat surface 16 on one side of and adjacent the end thereof opposite the end on which feeler 13 is mounted. As shown in Figure 1, flat surface 16 may be brought against a face 17 of a crank shaft bearing 18 of a connecting rod 19. When the flat surface 16 of gauge 10 is in engagement with bearing side surface 17, the body extends along the connecting rod substantially parallel thereto. Feeler 13 is provided with a head 21, and the gauge is so placed that the feeler head 21 can be swung into engagement with the side surface 21' of the piston wrist pin bearing 22 of the connecting rod. As shown in Fig. 1, feeler 13 is provided with two arms 23 and 24 projecting on opposite sides of the pivot 26 thereof. Feeler head 21 is carried by the arm 23, while arm 24 terminates in a pointer 27. The gauge is provided with a scale insert 28 behind the pointer 27 on which the angular position of feeler 13 may be read. Manufacturer's specifications set a precise displacement between the plane of crank shaft bearing surface 17 and the wrist pin bearing surface 21' which must be maintained, and this displacement is read on scale 28. Feeler 14 is provided with a head 29 which is engageable with the central portion 30 of the connecting rod. Feeler 14 includes arms 31 and 32 projecting on opposite sides of the pivot 33 thereof. Feeler head 29 is carried at one end of arm 31, while arm 32 terminates in a pointer 34. A scale 36 is provided on the body 12 behind pointer 34 for reading the angular displacement of feeler 14.

When the gauge 10 is placed in the position shown in Figure 1 with the flat surface 16 engaging bearing face 17, the feelers 13 and 14 may be swung until feeler head 21 engages piston bearing 22 while feeler head 29 engages the central portion of the connecting rod. The relative alignment of the bearing surfaces and the central portion of the connecting rod may readily be read on the scale, whereby it can quickly be determined if the connecting rod is out of true shape.

If desired, the gauge may be used to check alignment of the rod with a piston in place thereon. When a piston is mounted on wrist pin bearing 22, gauge 10 is placed against crank shaft bearing surface 17 as described above, and feeler head 21 may be brought into engagement with the wrist pin bearing surface 21' of the connecting rod inside the piston in the same manner as already described without removing the piston from the connecting rod.

The gauge illustrated in the drawing and described above is subject to structural modification without departing from the spirit and scope of the appended claims.

Having described my invention, what I claim as new and desire to secure by Letters Patent is:

1. A gauge for measuring the displacement between the faces of the crank shaft and wrist pin bearings of a connecting rod which comprises an elongated unitary body having a flat surface on one side adjacent one end thereof for engaging one side of the crank shaft bearing of the connecting rod, a feeler pivotally attached to the other end thereof, said feeler comprising two arms projecting on opposite sides of the pivot thereof, one of said arms having a head engageable with the wrist pin bearing of the connecting rod, there being a pointer on the other arm of said feeler, a scale attached to the body opposite the pointer for registering the relative alignment of the wrist pin bearing with a plane containing said side of the crank shaft bearing, and another feeler pivotally attached to the body at a location between the feeler pointer and the flat surface thereof, said other feeler comprising an arm engageable with the central portion of the connecting rod.

2. A gauge for measuring the displacement between the faces of the crank shaft and wrist pin bearings of a connecting rod which comprises an elongated unitary body having a flat surface on one side adjacent one end thereof for engaging one side of the crank shaft bearing of the connecting rod, a feeler pivotally attached to the other end thereof, said feeler comprising two arms projecting on opposite sides of the pivot thereof, one of said arms having a head engageable with the wrist pin bearing of the connecting rod, there being a pointer on the other arm of said feeler, a scale attached to the body opposite the pointer for registering the relative alignment of the wrist pin bearing with a plane containing said side of the crank shaft bearing, another feeler pivotally attached to the body at a location between the pointer of the first mentioned feeler and the flat surface of the body, said other feeler comprising two arms projecting on opposite sides of the pivot thereof, one of the arms of the other feeler having a head engageable with the central portion of the connecting rod, there being a pointer on the other arm of said other feeler, and a scale attached to the body opposite the pointer of the feeler for registering relative alignment of the central portion of the connecting rod with the plane of the side of the crank shaft bearing.

3. A gauge for measuring the displacement between the faces of the crank shaft and wrist pin bearings of a connecting rod which comprises an elongated unitary bar, there being a flat face on one side of the bar adjacent one end thereof for engaging one side of the crank-shaft bearing of the rod, the other end of the bar being bifurcated, a feeler member pivotally mounted between the bifurcations, said feeler member comprising two arms projecting on opposite sides of the pivotal mounting thereof, one of said arms having a head engageable with one side of the wrist pin bearing, a pointer on the other arm overlying the bar, and a scale extending transversely of the bar and underlying the pointer for registering the relative alignment of the wrist pin bearing face with a plane containing said side of the crank shaft bearing.

References Cited in the file of this patent

UNITED STATES PATENTS

| Number | Name | Date |
|---|---|---|
| 1,592,118 | McBain | July 13, 1926 |

OTHER REFERENCES

Publication: Page 16 of "Motor Age" for May 29, 1924.